United States Patent [19]

Inaba et al.

[11] 4,327,831
[45] May 4, 1982

[54] DISK RECORD CONTAINER

[75] Inventors: Shosei Inaba, Yokohama; Toshiro Okada, Tokyo, both of Japan

[73] Assignee: Victor Company of Japan, Limited, Yokohama, Japan

[21] Appl. No.: 166,688

[22] Filed: Jul. 2, 1980

[30] Foreign Application Priority Data

Jul. 7, 1979 [JP] Japan .............................. 54-93057[U]

[51] Int. Cl.³ ........................ B65D 85/57; B65D 85/30
[52] U.S. Cl. .................................... 206/310; 206/313; 206/444; 220/334
[58] Field of Search ............... 206/444, 387, 310, 313, 206/309, 303, 45.34; 220/334

[56] References Cited

U.S. PATENT DOCUMENTS

| | | | |
|---|---|---|---|
| 3,487,919 | 6/1970 | Elliott et al. | 206/387 |
| 3,640,379 | 2/1972 | Weingarden | 206/387 |
| 3,949,872 | 4/1976 | Paudras | 206/310 |
| 4,199,061 | 4/1980 | Harkleroad et al. | 206/313 |

Primary Examiner—William T. Dixson, Jr.
Attorney, Agent, or Firm—Lowe, King, Price & Becker

[57] ABSTRACT

A disk record container comprises first and second plates respectively having circular recesses for receiving a phonograph or video disk therebetween. An annular recess is made on each of the bottom of the circular recess of each plate so that the sound groove portion on each side of a disk does not abut on the first and second plates. Additional recesses are provided around the circular recess of each of the first and second plates for making it easy to take out and put a disk without touching the sound groove portion. The first and second plates are connected by a transparent film which has a bendable center band portion so that the first and second plates are plied up when the container is closed. A plurality of like plates may be added between the first and second plates for containing more disks. The transparent film is attached to the first and second plates at three peripheral edges of each of the plates so that at least a sheet of paper can be inserted in a pocket defined by the back of each plate and the film.

22 Claims, 18 Drawing Figures

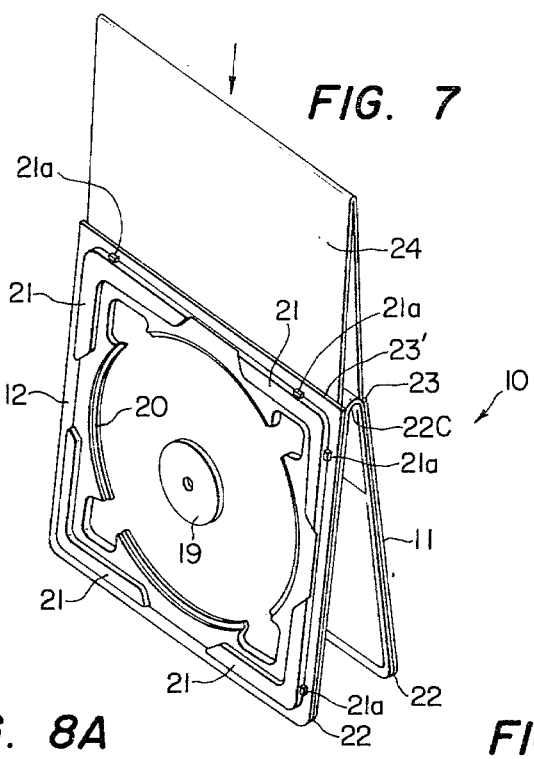
FIG. 7
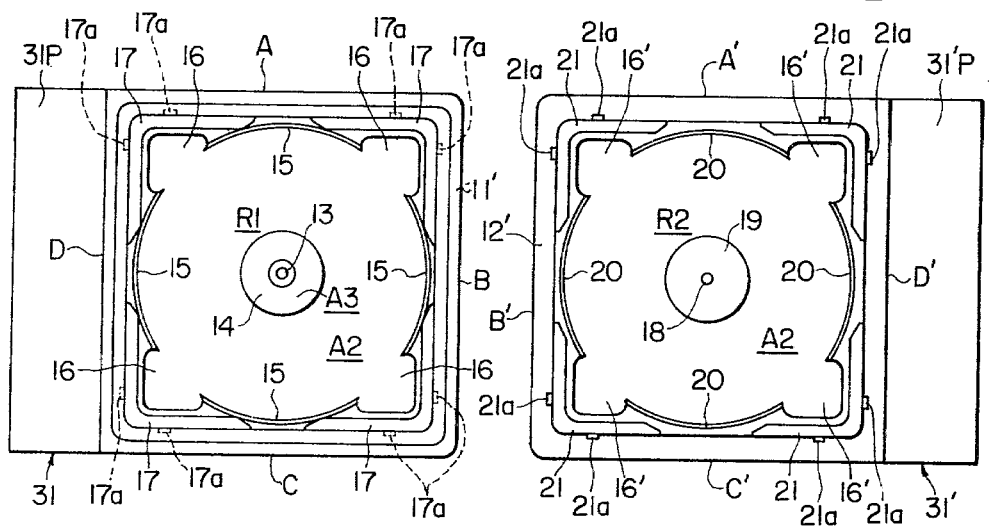
FIG. 8A  FIG. 8B
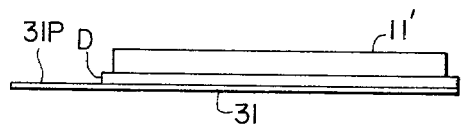  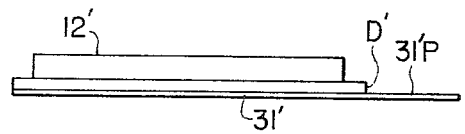
FIG. 8A'  FIG. 8B'

DISK RECORD CONTAINER

FIELD OF THE INVENTION

This invention generally relates to a container for disk records such as phonograph disks and video disks.

BACKGROUND OF THE INVENTION

Disk records are usually sold with a jacket or case made of paper. The disk in inserted in a plastic or paper bag prior to insertion in the jacket or case. When keeping disks, the jackets are placed vertically or horizontally. Therefore, it is troublesome to take out a disk from the jacket and to restore the same where it was. Furthermore, users of disks have to be very careful not to directly touch the sound groove portions on the disk surfaces and also not to drop the disk. The plastic bag is usually made of a soft material, such as polyethylene so that the plastic bag is apt to crease during frequent use. Such creases make it further difficult to insert a disk into the plastic bag.

In addition, the disk surfaces are apt to be rubbed by the plastic bag when taking out or restoring the disk, resulting in damage or spoil of the sound groove portions. Furthermore, as the result of such friction between the disk surfaces and the inner walls of the plastic bag, the disk is charged so that the disk will become more attractive with respect to dust.

SUMMARY OF THE INVENTION

The present invention has been developed in order to remove the above-mentioned disadvantages inherent to conventional disk containers.

It is therefore, a primary object of the present invention to provide a new and useful disk record container which is easy to use.

Another object of the present invention is to provide a disk record container from which a disk is readily taken out without touching the sound groove portions.

A further object of the present invention is to provide a disk record container in which the sound groove portions on the disk surfaces do not come into contact with the container when kept therein.

A yet further object of the present invention is to provide a disk record container in which the disk surfaces are not rubbed by the container when taking out and restoring the disk.

A still further object of the present invention is to provide a disk record container which protects a disk when external force is applied.

A still further object of the present invention is to provide a disk record container which is free from moisture and simultaneously keeps the disk from getting musty.

A still further object of the present invention is to provide a disk record container which may be readily produced by an injection molding technique, a vacuum forming technique or a thermocompressing bonding and pressing technique.

A still further object of the present invention is to provide a disk record container which is adjustable with respect to the number of disks to be contained.

BRIEF DESCRIPTION OF THE DRAWINGS

These and other objects and features of the present invention will become more readily apparent from the following detailed description of the preferred embodiments taken in conjunction with the accompanying drawings in which:

FIG. 7 shows how a sheet of paper is inserted into the pockets of the first embodiment of FIG. 2;

FIGS. 8A and 8B are top views of third and fourth plates used in the second embodiment of the container according to the present invention;

FIGS. 8A' and 8B' are side views of the second and fourth plates shown in FIGS. 8A and 8B;

DETAILED DESCRIPTION OF THE PREFERRED EMBODIMENTS

Prior to describing the embodiments of the present invention, a customary record container will be described with reference to FIG. 1 for a better understanding of the objects of the present invention.

Figure 1:
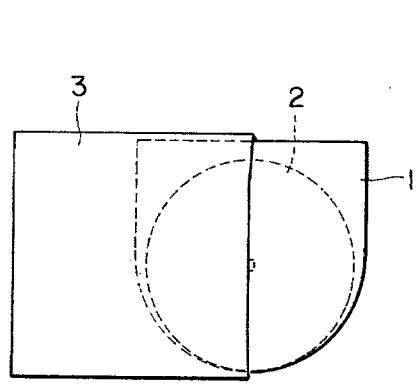
FIG. 1 is a perspective view of a conventional jacket having a plastic bag for containing a disk.

FIG. 1 is a schematic view of a conventional record container. Namely, a disk 2 is first inserted in a plastic bag 1 having an opening at one end, and then the plastic bag 1 including the disk 2 is inserted in a record jacket 3, which is usually made of paper, also having an open end. Although this conventional disk container is simple, it is somewhat troublesome to take out the disk and restore the same without thumbmarking on the sound groove portions. In addition, as described hereinabove the disk surfaces are apt to be rubbed when the disk is taken out and restored.

Figure 2:
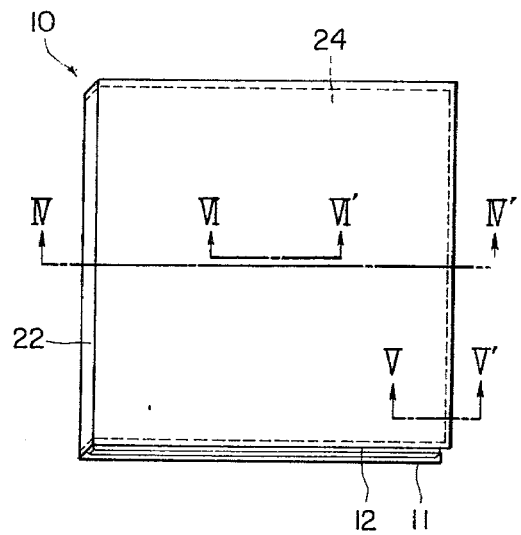
FIG. 2 is a schematic perspective view of a first embodiment of the container according to the present invention.
Figure 3:
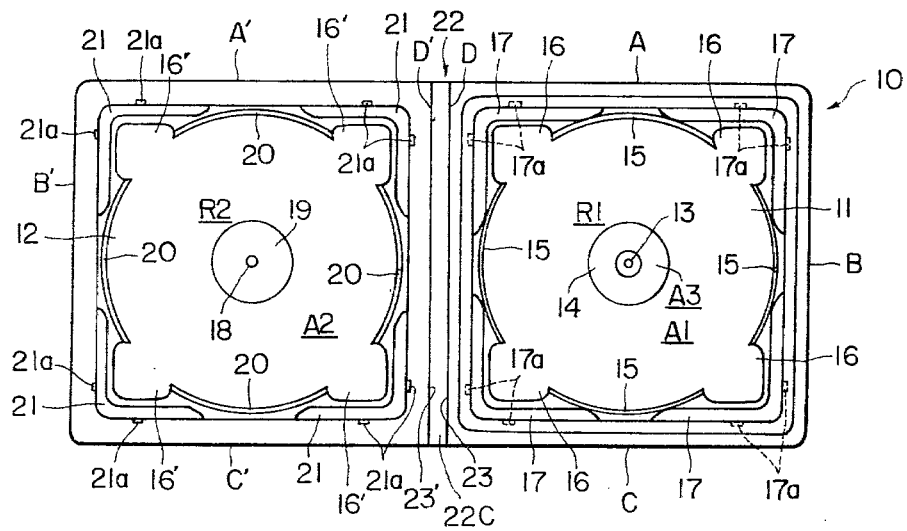
FIG. 3 is a schematic top view of the plates used in the first embodiment of FIG. 2.
Figure 4:
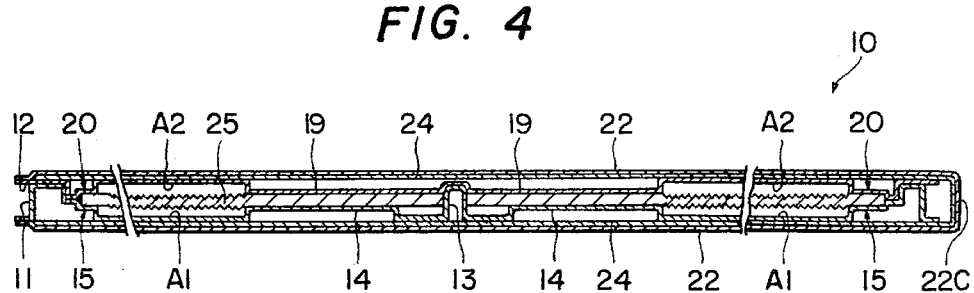
FIG. 4 is a cross-sectional view of the container of FIG. 3 taken along the line IV-IV'.

Reference is now made to FIG. 2 which is a schematic perspective view of a first embodiment of the disk record container according to the present invention. The container according to the present invention, which is generally designated at 10, can be opened or closed as a book, and the closed state of the container is shown in FIG. 2, while the opened state of the same is shown in FIG. 3. For a better understanding three cross-sectional views taken along lines IV—IV', V—V' and VI—VI' in FIG. 2 are respectively hown in FIG. 4, FIG. 5 and FIG. 6.

The container 10 comprises first and second plates 11 and 12 made of a synthetic resin, rubber or the like. Each of the first and second plates 11 and 12 has a top and a back, and the top view of the plates 11 and 12 is shown in FIG. 3. The plates 11 and 12 are substantially square, and a transparent plastic film or sheet 22 is attached to the backs of the first and second plates 11 and 12. The first and second plates 11 and 12 are spaced from each other as shown in FIG. 3. In other words, the longitudinal length of the transparent sheet 22, which may be made of a synthetic resin, is greater than the sum of the length along one side of each plate 11 or 12. As a result, the transparent sheet 22 has a center band portion 22C on which the first or second plate is not attached. This center band portion 22C is, of course bendable so that these two plates are piled up when the container is closed as shown in FIG. 2, and FIGS. 4 to 6.

The transparent sheet 22 is adhered to the back of the first plate 11 at three peripheral edges A, B and C, and also to the back of the second plate 12 at its three peripheral edges A', B' and C', by high-frequency stitching technique. However, the remaining edges D and D' of the first and second plates 11 and 12 are not stitched with the sheet 22. As a result, the back of the first plate 11 and the transparent sheet 22 define a pocket 23, while the back of the second plate 12 and the transparent sheet 22 also define another pocket 23'. These pockets 23 and 23' will be used for holding (a) suitable sheet(s) of paper 24 which may include indications of titles of the information prerecorded on the disk as shown in FIG. 7. Although in FIG. 7, a sheet of paper 24 is shown to be inserted in these pockets 23 and 23', two sheets may be respectively inserted in respective pockets 23 and 23' if desired. Pictures or titles printed on the surface of the sheet(s) will be seen through the transparent sheet 22 giving the user of the disk necessary information.

Turning back to FIGS. 3 to 6, the first plate 11 has a first circular recess R1 defined by a round periphery corresponding to the diameter of a disk 25. The first circular recess R1 is made on the top of the first plate 11 for receiving one side of the disk 25. In the same manner, the second plate 12 has a second circular recess R2 made on the top thereof for receiving the opposite side of the disk 25. The bottoms of these recesses R1 and R2 are not flat as shown in the cross-sectional views of FIGS. 4 to 6. Namely, an annular recess A1 is made on the bottom of the first circular recess R1, while another annular recess A2 is made on the bottom of the second circular recess R2. The first annular recess A1 is coaxial with the first circular recess R1, while the second annular recess A2 is coaxial with the second circular recess R2. The width of each of the annular recesses A1 and A2 is made a little greater than the width of the sound groove portion on each side of the disk 25 so that none of the portions of the container comes into contact with the sound groove portions on both sides of the disk 25.

The first plate 11 further comprises a columnar projection 13 provided at the center thereof, namely at the center of the first circular recess R1, while the second plate 12 further comprises a cylindrical recess 18 at the center thereof, namely at the center of the second circular recess R2. The columnar projection 13 is used as a spindle to engage with the center hole of the disk 25 when the disk 25 is placed on the first circular recess R1. The cylindrical recess 18 is used to receive the tip portion of the columnar projection 13 when the second plate 12 is piled up on the first plate 11 in the above-mentioned closed state of the container 10.

Although in the above, it has been described that each of the first and second plates 11 and 12 has a circular recess R1 or R2, and an annular recess A1 or A2, the shape or structure of the first and second plates 11 and 12 may be defined from different view points as follows:

Namely, the first plate 11 has a peripheral edge-support portion 15 which is stepped for receiving the periphery of the disk 25. In the same way, the second plate 12 has a peripheral edge-support portion 20 which is stepped for receiving the opposite side of the periphery of the disk 25. The first plate 11 also comprises a label-support portion 14, while the second plate 12 also comprises a second label-support portion 19. These label-support portions 14 and 19 are arranged to abut on respective labels L1 and L2 attached to the center of the disk 25 at both sides.

The peripheral edge-support portion 15 of the first plate 11 has a first step 15a and a second step 15b, while the peripheral edge-support portion 20 of the second plate 12 has a first step 20a and a second step 20b. The second steps 15b and 20b of these peripheral edge-support portions 15 and 20 are arranged to abut on each other when the container is closed.

The height of the first label-support portion 14 substantially equals the height of the first step 15a of the above-mentioned peripheral edge-support portion 15, and the portion between the peripheral edge-support portion 15 and the label-support portion 14 is lowered from the level of these support portions 14 and 15. The second plate 12 is also constructed in the same manner so that the sound groove portions at each side of the disk 25 is spaced from the first and second plates 11 and 12.

As is shown, around the columnar projection 13 a second annular recess A3 is provided. Namely, the label-support portion 14 is placed between two annular recesses A1 and A3 of the first plate 11. This annular recess A3 is provided for ensuring the insertion of the columnar projection 13 into the center hole of the disk. Namely, if the columnar projection 13 were projecting from the same level as the label-support portion 14, the disk 25 would not be placed securely on the label-support portion 14 and on the first step 15a of the peripheral edge-support portion 15 due to a rounded corner at the root of columnar projection 13. Such a rounded corner at the root of the columnar projection 13 cannot be avoided when the first plate 11 is manufactured by an injection molding technique. According to the present invention, however, such a round corner is placed below the level of the label-support portion 14 so that the columnar projection 13 will be inserted into the center hole of the disk until the first label L1 of the disk 25 comes into contact with the label support portion 14 of the first plate 11.

The first and second plates 11 and 12 also comprise a plurality of additional recesses 16 and 16' respectively. These additional recesses 16 and 16' are placed adjacent to the first circular recess R1 and the second circular recess R2 respectively. The bottom of each of these additional recesses 16 and 16' is flush with the bottom of the corresponding circular recess R1 or R2 so that the user of the container can readily take the disk 25 out of the container 10 by inserting his or her fingers into one or two of these additional recesses 16 and 16'. Although these additional recesses 16 and 16' are provided for both of the first and second plates 11 and 12 in the shown embodiment, such additional recesses may be provided for only one of these two plates 11 and 12 if desired. In this embodiment, four additional recesses 16 are provided for the first plate 11 and are respectively placed at the four corners of the first plate 11, while another four additional recesses 16' are provided in the same manner for the second plate 12.

Figure 5:
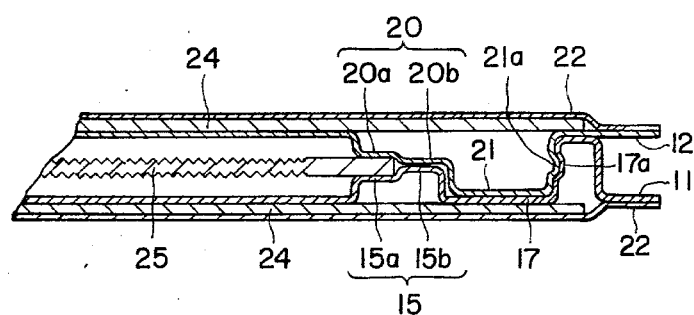
FIG. 5 is a cross-sectional view of the container of FIG. 2 taken along the line V-V'.
Figure 6:
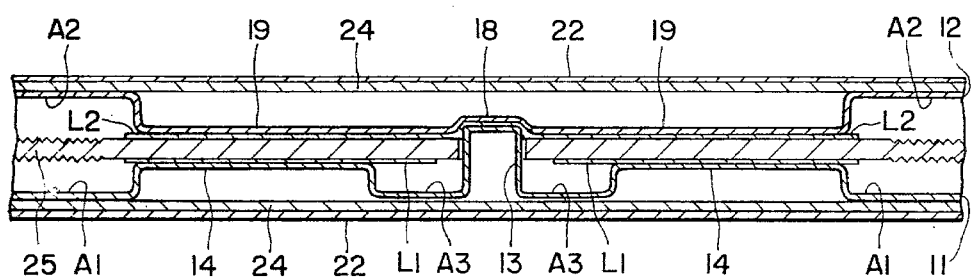
FIG. 6 is a cross-sectional view of the container of FIG. 2 taken along the line VI-VI'.

The first plate 11 comprises four female connectors 17, while the second plate 12 comprises four male connectors 21 which are arranged to engage with the corresponding female connectors 17. The female connectors 17 and male connectors 21 are respectively L-shaped recesses and L-shaped projections when viewed from the top of each of the first and second plates 11 and 12. The engagement between these connectors 17 and 21 is shown in FIG. 5, and in the drawing, it is shown that the female connector 17 has a concave portion 17a, while the male connector 21 has a convex portion 21a which is arranged to be engaged with the concave portion 17a when the male and female connectors 21 and 17 are engaged with each other. The combination of the concave and convex portions 17a and 21a functions as a lock, and is utilized for performing a snap action on engagement of the male and female connectors 21 and 17 so that these connectors 17 and 21 do not disengage from each other unless a given force is applied to the first and second plates 11 and 12. Accordingly, dropping of the disk 25 due to unexpected opening of the container 10 is prevented. Furthermore, dust is prevented from getting in the container 10 so that the disk 25 can be kept clean.

In the above-described first embodiment of the container according to the present invention, only a single disk can be contained. However, if the number of like plates increased and these plates are combined, then a plurality of disks may be contained in a single container.

Figure 9A:
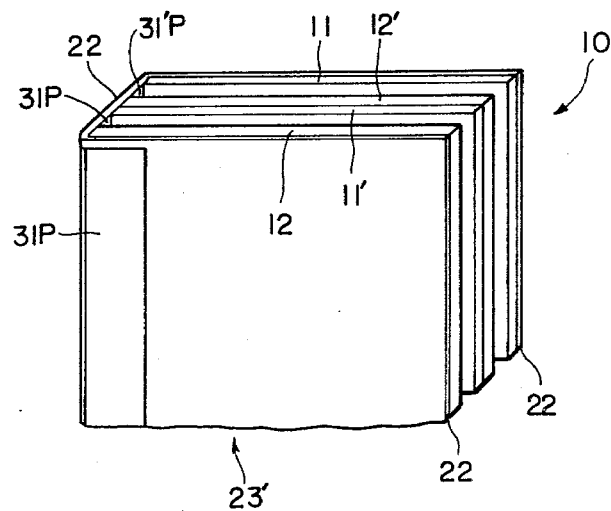
FIG. 9A is a schematic perspective view of the second embodiment of the container in which more than one disk can be contained.

Hence, reference is now made to FIG. 9A which shows a schematic perspective view of the second embodiment of the present invention. The same elements as in the first embodiment are designated with like numerals. The second embodiment container comprises not only first and second plates 11 and 12 but also third and fourth plates 11' and 12'. Namely, when the container 10 is closed as shown in FIG. 9, four plates 11, 12', 11' and 12 are piled up to contain a couple of disks (not shown). The third plate 11' has a top and a bottom constructed in the same manner as the first plate 11 while the fourth plate 12' also has a top and a bottom constructed in the same manner as the second plate 12. A transparent sheet 31 is attached to the back of the third plate 11', while another transparent sheet 31' is attached to the back of the fourth plate 12'. Each of the transparent sheet 31 and 31' is rectangular so that each transparent sheet 31 or 31' extends outwardly from one of the peripheral edges of each of the third and fourth plates 11' and 12' as shown in FIG. 8A and FIG. 8B. Each of the transparent sheets 31 and 31' is adhered to the back of each third or fourth plate 11' or 12' at three peripheral edges A, B and C, or A' B' or C'. Namely, the remaining edges D and D' are not fixedly connected to the transparent sheets 31 and 31' respectively. This means that the back of the third plate 11' and the transparent sheet 31 define a pocket, while the back of the fourth plate 12' and another transparent sheet 31' define another pocket so that a sheet of paper for supplying the user with various information may be inserted into each pocket. For instance, the words of songs recorded on the disk or disks, and introduction of the musician(s) may be printed on such a sheet. FIGS. 8A' and 8B' are respectively side views of the third and fourth plates 11' and 12' with respective transparent sheets 31 and 31'. The protruding portions of the transparent sheets 31 and 31' are respectively designated at 31P and 31'P, and these protruding portions 31P and 31'P are respectively inserted into the second pocket 23' defined by the back of the second plate 12 and the aforementioned transparent sheet 22, and into the first pocket 23 defined by the back of the first plate 11 and the same transparent sheet 22. In FIG. 9A, the protruding portion 31P is shown to be inserted in the second pocket 23'. Of course another sheets of paper may be inserted into these first and second pockets.

Figure 9B:
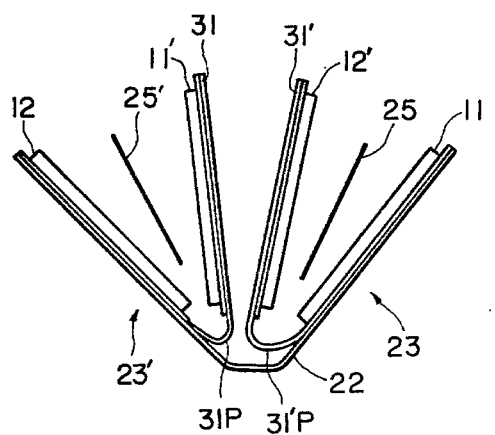
FIG. 9B is a bottom view of the second embodiment of FIG. 9A.

FIG. 9B is a bottom view of the second embodiment container shown in FIG. 9A. As is shown in FIG. 9B, two disks 25 and 25' are respectively sandwiched between the first and fourth plates 11 and 12', and between the second and third plates 12 and 11'.

Figure 9C:
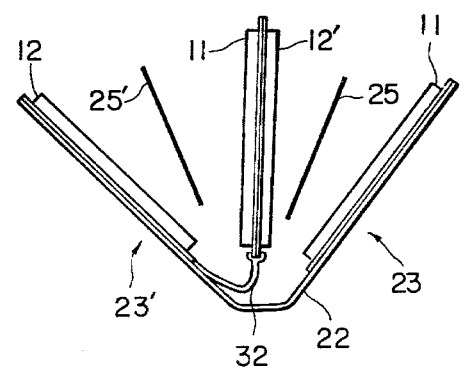
FIG. 9C is a bottom view of a variation of the second embodiment.

FIG. 9C illustrates a variation of the second embodiment. The construction of the container of FIG. 9C differs from that of the second embodiment in that the backs of the third and fourth plates 11' and 12' are connected to each other. Since the backs of the third and fourth plates 11' and 12' are directly connected to each other, a transparent sheet 32 is connected to one or both of the one side edges of these plates 11' and 12'. The transparent sheet 32 is inserted into one of the first and second pockets 23 and 23'.

In the above described second embodiment of FIGS. 9A and 9B and its variation of FIG. 9C, the third and fourth plates 11' and 12' are connected to the body 10 by means of one or two transparent sheet(s) 32 or 31 and 31'. However, these additional plates may be connected to the body 10 of the container in other ways, while the number of like plates may be increased if desired to contain more disks.

Figure 10A:
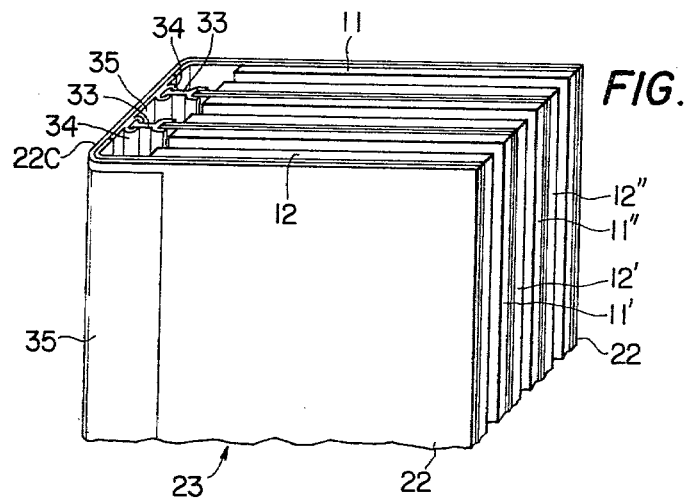
FIG. 10A is schematic perspective view of the third embodiment of the container according to the present invention.
Figure 10B:
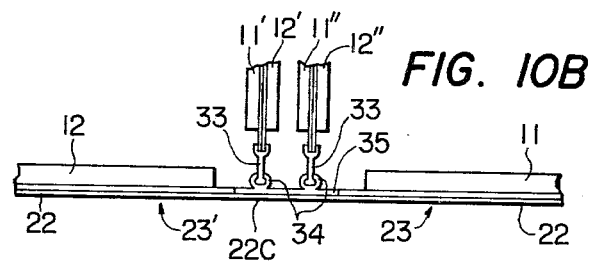
FIG. 10B is a bottom view of the third embodiment of FIG. 10A.

FIG. 10A is a schematic perspective view of the third embodiment of the container according to the present invention. In this embodiment, the backs of third and fourth plates 11' and 12' are connected to each other, while fifth and sixth plates 11" and 12" are connected in the same manner. Each of the combinations of two plates has a male connector 33 at one side which is arranged to be received in a female connector 34 disposed at the center band portion 22C of the transparent sheet 22. In detail, the male connector 33 has a T-shaped projection, while the female connector 34 has a C-shaped projection to be engaged with the male connector 33. A plurality of female connectors 34 are connected to a sheet 35 which is placed on the center band portion 22C of the transparent sheet 22. Both end portions of the sheet 35 are respectively inserted into the first and second pockets 23 and 23' as shown in FIG. 10A. The above-described construction will be shown in detail in FIG. 10B which is a bottom view of the container 10 of FIG. 10A.

Figure 11A:
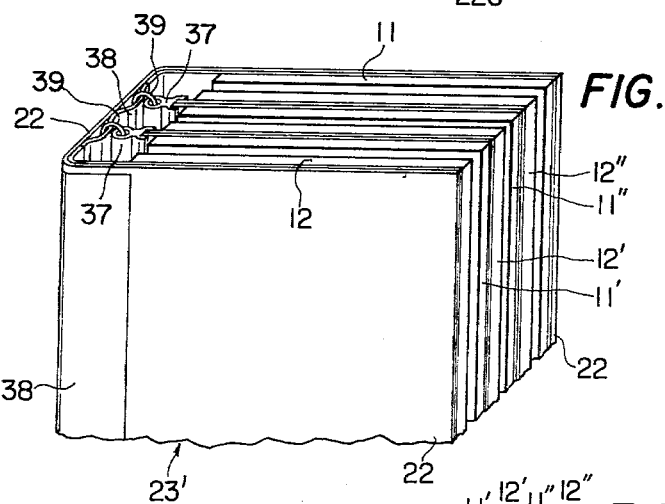
FIG. 11A is a schematic perspective view of the fourth embodiment of the container according to the present invention.
Figure 11B:
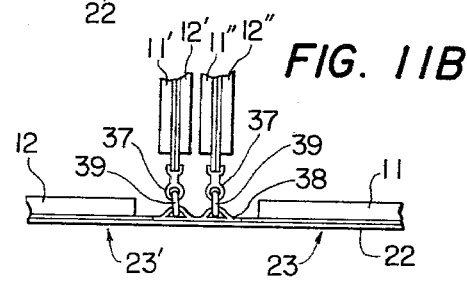
FIG. 11B is a bottom view of the fourth embodiment of FIG. 11A.

FIG. 11A is a schematic perspective view of the fourth embodiment of the container according to the present invention. The fourth embodiment also comprises six plates 11, 12, 11', 12', 11" and 12" in the same manner as the third embodiment. Each combination of the third and fourth plate 11' and 12', and the fifth and sixth plates 11" and 12" is connected to the body by means of a hook 39. In detail, as shown in FIG. 11B, which is a bottom view of the container of FIG. 11A, each of the combination of two plates has a tube like member 37 at one side edge thereof. A wave-shaped sheet 38 is placed on the center band portion 22C of the transparent sheet 22 and both end portions of the sheet 38 are respectively inserted in the first and second pockets 23 and 23'. One end of a U-shaped hook 39 is inserted into the hollow of the tube like member 37, while the opposite end of the U-shaped hook 39 is inserted into another hollow defined by the wave-shaped sheet 38 and the transparent sheet 22.

From the above it will be understood that the additional plate in the second embodiment and the combination of the additional plates in the variation of the second embodiment as well as in the third and fourth embodiments may be readily added or removed to increase and decrease the number of disks. Therefore, in these second to fourth embodiments of FIG. 9A to FIG. 11B, the number of disks may be increased as desired until it reaches a maximum number which is determined by the width of the center band portion 22C of the transparent sheet 22.

It will be also understood that the structure and shape of the third and fifth plates 11' and 11" are the same as those of the first plate 11, while the structure and shape of the fourth and sixth plates 12' and 12" are the same as those of the second plate 12. Consequently, the manufacture of the container is required to produce only two kinds of plates so that a disk recording container which can contain a number of disks may be manufactured at low cost.

The above-described embodiments are just examples of the present invention, and therefore it will be understood for those skilled in the art that many modifications and variations may be made without departing from the spirit of the present invention.

What is claimed is:

1. A disk record container comprising:
   (a) a first plate having a top surface and a back surface, a first circular recess made on said top surface for receiving one side of a disk, and a first annular recess made on the bottom of said first circular recess;
   (b) a second plate having a top surface and a back surface, a second circular recess made on said top for receiving the opposite side of said disk, and a second annular recess made on the bottom of said second circular recess; and
   (c) a sheet made of substantially transparent film for connecting said first and second plates to each other in such a manner that said disk will be sandwiched between said first and second plates, said sheet substantially covering the back surfaces of said first and second plates and being secured to each of said first and second plates to thereby form an outwardly facing pocket between said sheet and the back surface of said first plate, and another outwardly facing pocket between said sheet and the back surface of said second plate.

2. A disk record container comprising:
   (a) a first substantially square-shaped plate having top and back surfaces, four peripheral edges, a first substantially circular recess formed on the top surface for receiving one side of a disk, and a first annular recess formed on the bottom of said first circular recess;
   (b) a second substantially square-shaped plate having top and back surfaces, four peripheral edges, a second substantially circular recess formed on said top surface for receiving an opposite side of said disk, and a second annular recess formed on the bottom of said second circular recess;
   (c) a sheet made of substantially transparent film for connecting said first and second plates to each other in such a manner that said disk will be sandwiched between said first and second plates, said sheet substantially covering the back surfaces of said first and second plates and being secured to each of said first and second plates at three peripheral edges of each of said plates, thereby forming an outwardly facing pocket when said container is closed between said sheet and the back surface of said first plate, and another outwardly facing pocket between said sheet and the back surface of said second plate.

3. A disk record container as claimed in claim 1, wherein each of said first and second plates is substantially square-shaped, having four peripheral edges.

4. A disk record container as claimed in claim 3, wherein said sheet is adhered to each of said first and second plates at three peripheral edges of each of said plates for providing a pocket between said sheet and the back of said first plate, and another pocket between said sheet and the back of said second plate.

5. A disk record container as claimed in claim 1 or 2, wherein said sheet is made of a synthetic resin.

6. A disk record container as claimed in claim 1 or 2, wherein said sheet has its longitudinal length such that said first and second plates are spaced from each other when said container is opened.

7. A disk record container as claimed in claim 6, wherein said sheet comprises a center band portion to which said first or second plate is attached, said center band portion being bendable.

8. A disk record container as claimed in claim 1 or 2, further comprising a columnar projection provided at the center of said first plate, and a cylindrical recess provided at the center of said second plate for receiving the tip of said columnar projection.

9. A disk record container as claimed in claim 1 or 2, further comprising a plurality of additional recesses made adjacent to at least one of said first circular recess or said second circular recess.

10. A disk record container as claimed in claim 9, wherein each of said additional recesses has its bottom which is flush with the bottom of said first or second circular recess.

11. A disk record container as claimed in claim 9, wherein each of said first and second plates comprises four of said additional recesses made at four corners thereof.

12. A disk record container as claimed in claim 1 or 2, further comprising means for engaging said first and second plates when said first and second plates are piled up to close the container.

13. A disk record container as claimed in claim 12, wherein said means for engaging comprises a plurality of projections made on the top of one of said first and second plates, and a plurality of recesses made on the top of the other plate for receiving corresponding projections respectively when said first and second plates are piled up to close the container.

14. A disk record container as claimed in claim 13, further comprising locking means so that said means for engaging performs a snap action on engagement and disengagement.

15. A disk record container as claimed in claim 1 or 2, further comprising at least a third plate having substantially the same construction as said first plate, and at least a fourth plate having substantially the same construction as said second plate, a first disk being sandwiched between said first and fourth plates, while a second disk is sandwiched between said second and third plates.

16. A disk record container as claimed in claim 15, further comprising means for attaching said third and fourth plates to said connecting means.

17. A disk record container as claimed in claim 16, wherein said means for attaching comprises two transparent sheets respectively adhered to the backs of said third and fourth plates at three peripheral edges of each plate, each of said transparent sheets extending outwardly from one of the peripheral edges of each of said plates.

18. A disk record container as claimed in claim 16, wherein the backs of said third and fourth plates are fixedly attached to each other.

19. A disk record container as claimed in claim 18, wherein said means for attaching comprises a sheet connected to one of the peripheral edges of said third or fourth plates.

20. A disk record container as claimed in claim 18, wherein said means for attaching comprises a sheet connected to one of the peripheral edges of the combination of said third and fourth plates.

21. A disk record container as claimed in claim 16, wherein said means for attaching comprises at least one male connector connected to said third and/or fourth plates, and at least one female connector connected to said connecting means.

22. A disk record container as claimed in claim 16, wherein said means for attaching comprises at least one tube like member connected to said third and/or fourth plates, at least one wave-shaped sheet attached to said connecting means, and at least one U-shaped hook having a first end inserted into a hollow of said tube like member and a second end inserted into a hollow defined between said wave-shaped sheet and said connecting means.

* * * * *